July 2, 1929.  A. C. E. STROM  1,719,315
VAGINAL DOUCHE
Filed May 24, 1926
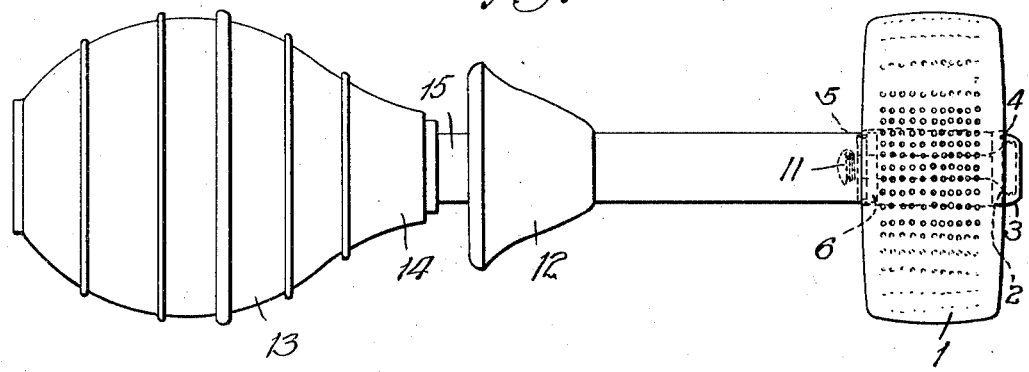
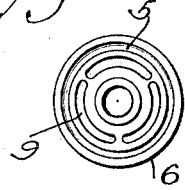
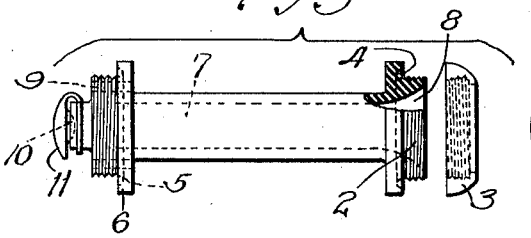
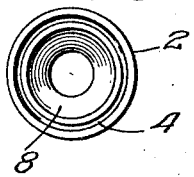
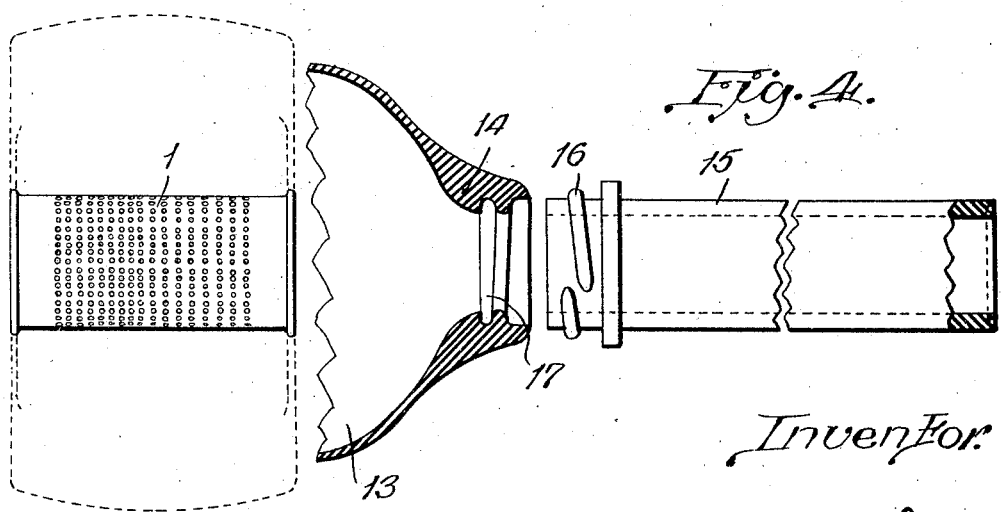
Inventor
Arthur C. E. Strom Patented July 2, 1929.

1,719,315

UNITED STATES PATENT OFFICE.

ARTHUR C. E. STROM, OF DETROIT, MICHIGAN.

VAGINAL DOUCHE.

Application filed May 24, 1926. Serial No. 111,347.

My invention relates to improvements having for their object the thorough cleansing of the vaginal tract. This operation has never been satisfactorily accomplished by present methods; the reasons being that time is an essential factor in complete sterilization with the weaker solutions generally used, and that complete unfoldment of the vaginal folds is absolutely necessary. The hasty dash of the ordinary douche is more or less useless, and very often harmful because of the strong solutions required. My invention attains the desired result by means of an easy-adjustable dilating bulb to be inserted: and any degree of distention desired can be had by simply varying pressure upon the hand bulb containing the liquid: the tiny needle jets of antiseptic solution impinge upon the unfolded mucous membrane of the vagina and thus will cleanse as never before; the time factor is taken care of by very slowly withdrawing the dilating bulb while distended—the posterior portion being thus kept filled. Details of the correct operation will be given in latter part of specifications.

Fig. 1 is a perspective view of the assembled douche. Fig. 2 shows the stem plug. Fig. 3 exhibits the finely perforated cylinder in position. Fig. 4 is a section through part of the bulb and tube. Fig. 5 is a cross section of the stem plug's inner end. Fig. 6 is a cross section of its outer end.

Figure 1, of the accompanying drawings, shows the assembled douche with the dilator bulb distended in an approximate shape it will take within vagina; member 1 is a pure gum rubber cylinder very finely perforated—preferably perforated only at forward half portion but completely perforated when so ordered, as these cylinders are quickly interchangeable and cost but a few cents; 2 is the outer end of stem plug to which is removably fastened said pure gum rubber cylinder; member 3 is a hard rubber cap to cover outer end of stem plug, a very thin washer being placed between said cap and said gum rubber cylinder; 4 is a groove in outer end of stem plug for securing forward end of said cylinder; 5 is a groove in inner end of stem plug for securing the other end of said cylinder; 6 is the inner end of said stem plug to which is removably fastened the other end of said cylinder; member 11 is a simple check valve to prevent outflow of liquid through bore 7—8; 12 is a very soft rubber shield slidably mounted on hard rubber tube 15; 13 is ordinary hand bulb; 14 is the neck of hand bulb—thickened and coarsely threaded for single-turn thread on hard rubber tube 15. Figure 2 illustrates the stem plug for removably securing the dilating element, the finely perforated pure gum rubber cylinder 1, also for regulating the outflow and inflow of liquid; member 3 is the cap; 4 is the groove for securing one end of said rubber cylinder; 5 is the groove for securing the other end of said rubber cylinder; 6 is the inner end of said stem plug, it is threaded and a very thin washer being placed thereat so that the parts can be tightened with an elastic element between; 7 is the barrel of said stem plug; 8 is the outer opening, tapered; 9 are openings through inner end of stem plug for the liquid passing outwardly into said rubber cylinder and thence into vagina; 10 is the inner opening; 11 is a simple check valve having a soft button in center to more effectively seal. Figure 3 is a perspective view of finely perforated pure gum rubber cylinder—it is preferably to be perforated only about the half distance of its length, although as illustrated may be satisfactory. Figure 4 is a sectional view of hand bulb and hard rubber tube; 13 is interior of hand bulb; 14 is the coarsely threaded neck of hand bulb; 15 is the hard rubber tube; 16 is a coarse, single-turn thread on inner end of hard rubber tube; 17 is a corresponding thread with said tube in position. Figure 5 shows inner end of stem plug; 5 is said groove; 6 is the flange on inner end of stem plug; 9, said openings. Figure 6 shows outer end of stem plug; 2 is the flange thereat; 4 is the said groove thereat; 8, said outer opening.

The operation of the douche is as follows: The tip or outer end is inserted into the vagina as far as possible, the soft rubber shield is adjusted tightly against the labia, after which pressure is applied to hand bulb until the desired degree of distention is reached (feeling indicating), when the posterior portion of vagina is filled with the antiseptic solution the perforated dilating bulb may be very slowly withdrawn—meanwhile the soft rubber shield is kept in original position against labia—as the withdrawal proceeds very, very slowly and the dilator's inner end reaches the soft rubber shield pressure upon the hand bulb is released and the used liquid returns through the stem plug back into the hand bulb. One operation should be sufficient since it should consume about 3 minutes of time. The instant connection between hard rubber tube and hand bulb permits mixing of the antiseptic solutions directly within the hand bulb, which is a convenience as well as an economy.

Having thus described my invention, I claim as new and desire to secure by Letters Patent:

In a vaginal douche, the combination with a liquid conducting tube having a flanged stem plug removably secured to the outer end of said conducting tube, the central bore of said stem plug being of less diameter than conducting tube bore while the outflow perforations of the lower flange of the stem plug are as large as possible without entering central bore of said stem plug, a finely perforated soft rubber cylinder having its ends removably secured on the flanges of the stem plug so that liquid from the conducting tube will flow through the openings in said lower flange whereby the central portion of said cylinder is expanded and liquid is discharged through the perforations in said cylinder, a suitable check valve mounted on nipple at lower end of the central bore of said stem plug insuring outflow through perforations in said lower flange, a tapered outer entrance to central bore of said stem plug, a threaded ring cap to cover outer flange of said stem plug and thus removably securing one end of said finely perforated cylinder, a pair of very thin washers permitting tightening of hard elements to soft element of the device, a soft rubber shield slidably mounted on the conducting tube, a coarse single-turn thread on lower end of conducting tube for engagement with a corresponding thread in neck of hand bulb reservoir, all substantially as specified.

ARTHUR C. E. STROM.